(12) United States Patent
Rasmussen et al.

(10) Patent No.: US 7,899,883 B2
(45) Date of Patent: Mar. 1, 2011

(54) MERGING VERSIONS OF DOCUMENTS USING MULTIPLE MASTERS

(75) Inventors: David John Rasmussen, Redmond, WA (US); Simon P. Clarke, Seattle, WA (US); Peter P. Baer, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 257 days.

(21) Appl. No.: 12/139,438

(22) Filed: Jun. 13, 2008

(65) Prior Publication Data
US 2009/0313331 A1    Dec. 17, 2009

(51) Int. Cl.
    G06F 15/16    (2006.01)
(52) U.S. Cl. ...................................................... 709/217
(58) Field of Classification Search ................ 709/217, 709/219
    See application file for complete search history.

(56) References Cited

U.S. PATENT DOCUMENTS

| | | | |
|---|---|---|---|
| 7,152,076 B2 | 12/2006 | Sundararajan et al. | |
| 7,200,668 B2 | 4/2007 | Mak et al. | |
| 7,222,138 B2 | 5/2007 | Fomenko | |
| 7,225,231 B2 | 5/2007 | Mendez et al. | |
| 7,231,410 B1 | 6/2007 | Walsh et al. | |
| 7,299,450 B2 | 11/2007 | Livshits et al. | |
| 2004/0148317 A1 * | 7/2004 | Sundararajan et al. | 707/201 |
| 2005/0091291 A1 * | 4/2005 | Kaler et al. | 707/203 |
| 2005/0234943 A1 | 10/2005 | Clarke | |
| 2005/0262107 A1 * | 11/2005 | Bergstraesser et al. | 707/100 |
| 2006/0106889 A1 | 5/2006 | Mannby | |
| 2006/0136513 A1 * | 6/2006 | Ngo et al. | 707/203 |
| 2006/0161516 A1 | 7/2006 | Clarke et al. | |
| 2007/0214497 A1 * | 9/2007 | Montgomery et al. | 726/4 |
| 2008/0177782 A1 * | 7/2008 | Poston et al. | 707/102 |

OTHER PUBLICATIONS

"Multi-Master Replication", retrieved at <<http://www.quinthar.com/UbiquityProject/Technologies/MultiMasterReplication/index.html>>, pp. 20.
"DocuComp Server Products", 2004-2006, DocuComp, LLC, pp. 3.
"Three-Way File Comparisons", 1993-2007, Araxis Ltd., pp. 2.

* cited by examiner

*Primary Examiner*—Jeffrey Pwu
*Assistant Examiner*—Scott M Sciacca
(74) *Attorney, Agent, or Firm*—Hope Baldauff Hartman, LLC

(57) ABSTRACT

Tools and techniques are described for merging versions of documents using multiple masters. These tools may provide methods that include syncing a first peer system with at least a second peer system, with the first and second peer systems receiving respective instances of a document for collaborative editing. The first and second peer systems may maintain respective version histories associated with the document, with these version histories capturing and storing revisions occurring locally at the first and second peer systems. The first and second peer systems may exchange version histories, and merge these version histories.

12 Claims, 9 Drawing Sheets

MERGING VERSIONS OF DOCUMENTS USING MULTIPLE MASTERS

BACKGROUND

High-speed communications networks are becoming increasingly available at reasonable costs to both enterprise and home users. These networks may enable different users to collaboratively edit shared documents, despite being distant from one another in some cases. Over time, these different users may provide disparate revisions to these shared documents, with these revisions being merged from time to time. In previous approaches, document collaboration systems may employ a single-master model, in which one master version of the shared document serves as the basis for merging subsequent revisions made to that shared document.

SUMMARY

Tools and techniques are described for merging versions of documents using multiple masters. These tools may provide methods that include syncing a first peer system with one or more other peer systems, with the peer systems receiving respective instances of a document for collaborative editing. The peer systems may maintain respective version histories of the document, with these version histories capturing and storing revisions occurring locally at the various peer systems. The peer systems may exchange version histories, and merge these version histories. The above-described subject matter may also be implemented as a method, computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
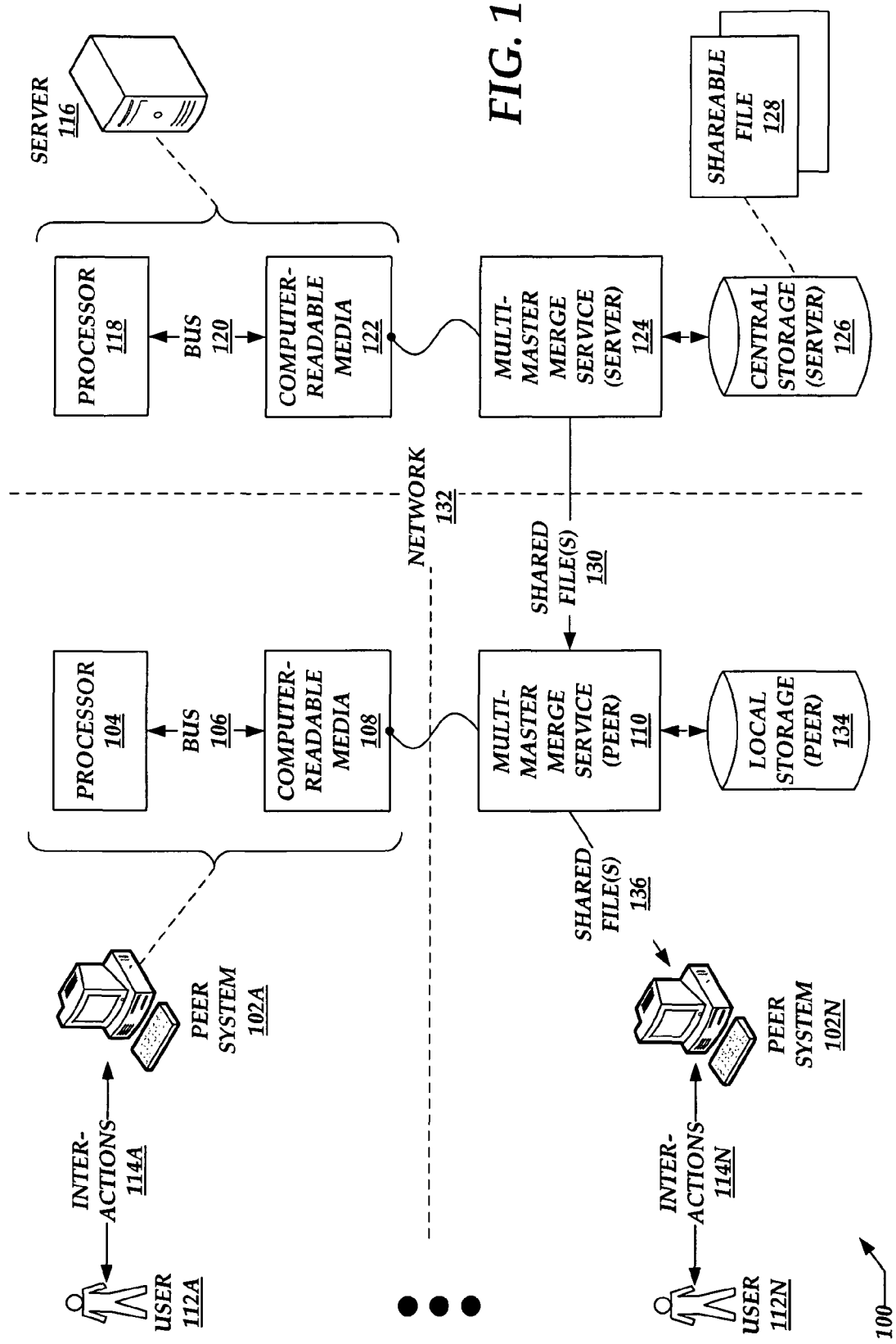
FIG. 1 is a combined block and flow diagram illustrating systems or operating environments for merging versions of documents using multiple masters.

The following detailed description is directed to technologies for merging versions of documents using multiple masters. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of tools and techniques for merging versions of documents using multiple masters will be described.

FIG. 1 illustrates systems or operating environments, denoted generally at 100, for merging versions of documents using multiple masters. These systems 100 may include one or more peer systems 102, with FIG. 1 providing examples of peer systems 102*a* and 102*n* (collectively, peer systems 102). However, implementations of the description herein may include any number of peer systems.

Turning to the peer systems 102 in more detail, the peer systems may include one or more processors 104, which may have a particular type or architecture, chosen as appropriate for particular implementations. The processors 104 may couple to one or more bus systems 106 chosen for compatibility with the processors 104.

The peer systems 102 may also include one or more instances of computer-readable storage media 108, which couple to the bus systems 106. The bus systems may enable the processors 104 to read code and/or data to/from the computer-readable storage media 108. The media 108 may represent storage elements implemented using any suitable technology, including but not limited to semiconductors, magnetic materials, optics, or the like. The media 108 may include memory components, whether classified as RAM, ROM, flash, or other types, and may also represent hard disk drives.

The storage media 108 may include one or more modules of instructions that, when loaded into the processor 104 and executed, cause the peer systems 102 to perform various techniques for merging versions of documents using multiple masters. As detailed throughout this description, these peer systems 102 may provide these services using the components, process flows, and data structures described and illustrated herein.

As an example of these modules of instructions, the storage media 108 may include software elements that provide a multi-master merge service, denoted generally at 110. In general, the peer systems 102 may facilitate interactions with any number of respective users, with examples of users indicated respectively at 112a and 112n (collectively, users 112). FIG. 1 also denotes respective interactions between particular users and corresponding peer systems at 114a and 114n (collectively, interactions 114). For example, the various users 112 may collaboratively edit respective versions of documents loaded onto their corresponding peer systems 102 from one or more server systems or servers 116. The servers 116 may participate in the peer-to-peer topologies described herein, similarly to the peer systems 102 (which may operate as clients, for example). In some scenarios, the server systems may perform specialized functions, such as backup or other roles. It is noted that these different users 112 may or may not collaboratively edit their local versions of these shared documents at the same time.

Turning to the server systems 116 in more detail, the server systems may include one or more processors 118, which may have a particular type or architecture, chosen as appropriate for particular implementations. The processors 118 in the server systems 116 may or may not have the same type and architecture as the processors 104 in the peer systems.

The processors 118 may couple to one or more bus systems 120 chosen for compatibility with the processors 118. The bus systems 120 in the server systems 116 may or may not be of the same type and architecture as the bus systems 106 included in the peer systems 102.

The server systems 116 may also include one or more instances of computer-readable storage media 122, which couple to the bus systems 120. The bus systems may enable the processors 118 to read code and/or data to/from the computer-readable storage media 122. The media 122 may represent storage elements implemented using any suitable technology, including but not limited to semiconductors, magnetic materials, optics, or the like. The media 122 may include memory components, whether classified as RAM, ROM, flash, or other types, and may also represent hard disk drives.

The storage media 122 may include one or more modules of instructions that, when loaded into the processor 118 and executed, cause the server systems 116 to perform various techniques for merging versions of documents using multiple masters. For example, the storage medium 122 may include server-side merge services 124, which are operative to provide multi-master merge services in cooperation with the peer-side merge services.

The storage media 122 may include server-side central storage elements 126, which may contain any number of documents or files 128. These files may be shareable across any number of peer systems 102. In the example shown, the server-side merge services 124 may retrieve the shareable files 128 from the storage 126, and provide them to the peer-side merge services 110. FIG. 1 generally denotes at 130 the files as provided by the server 116 to the peer systems 102. In general, the term "file" as used herein refers to any shareable generic resource, with documents being a non-limiting example of files.

In the example shown, the server systems 116 and the peer systems 102 may communicate over one or more intermediate communications networks 132. In addition, different ones of the peer systems 102 may communicate with one another over the networks 132. These networks 132 may be personal, local area, regional, or global in scope, and may utilize any appropriate communications protocols suitable in different implementations. In addition, the networks 132 may include any number of sub-networks, and may include wired or wireless communications components.

At the peer systems 102, the peer-side merge services 110 may receive the shared files 130, and store them in storage elements 134 maintained locally by different ones of the peer systems 102. As described further in the examples provided below, a given peer system (e.g., 102a) may receive the shared files 130, and may provide them in turn to another peer system (e.g., 102n), as denoted at 136. However, in other scenarios, the peer systems 102n may receive the shared files 136 currently from the server 116.

Having described the overall systems or operating environments 100 in FIG. 1, the discussion now turns to a description of components and data flows related to generating local revisions that are later merged using the tools and techniques described herein. This description is now presented with FIG. 2.

Figure 2:
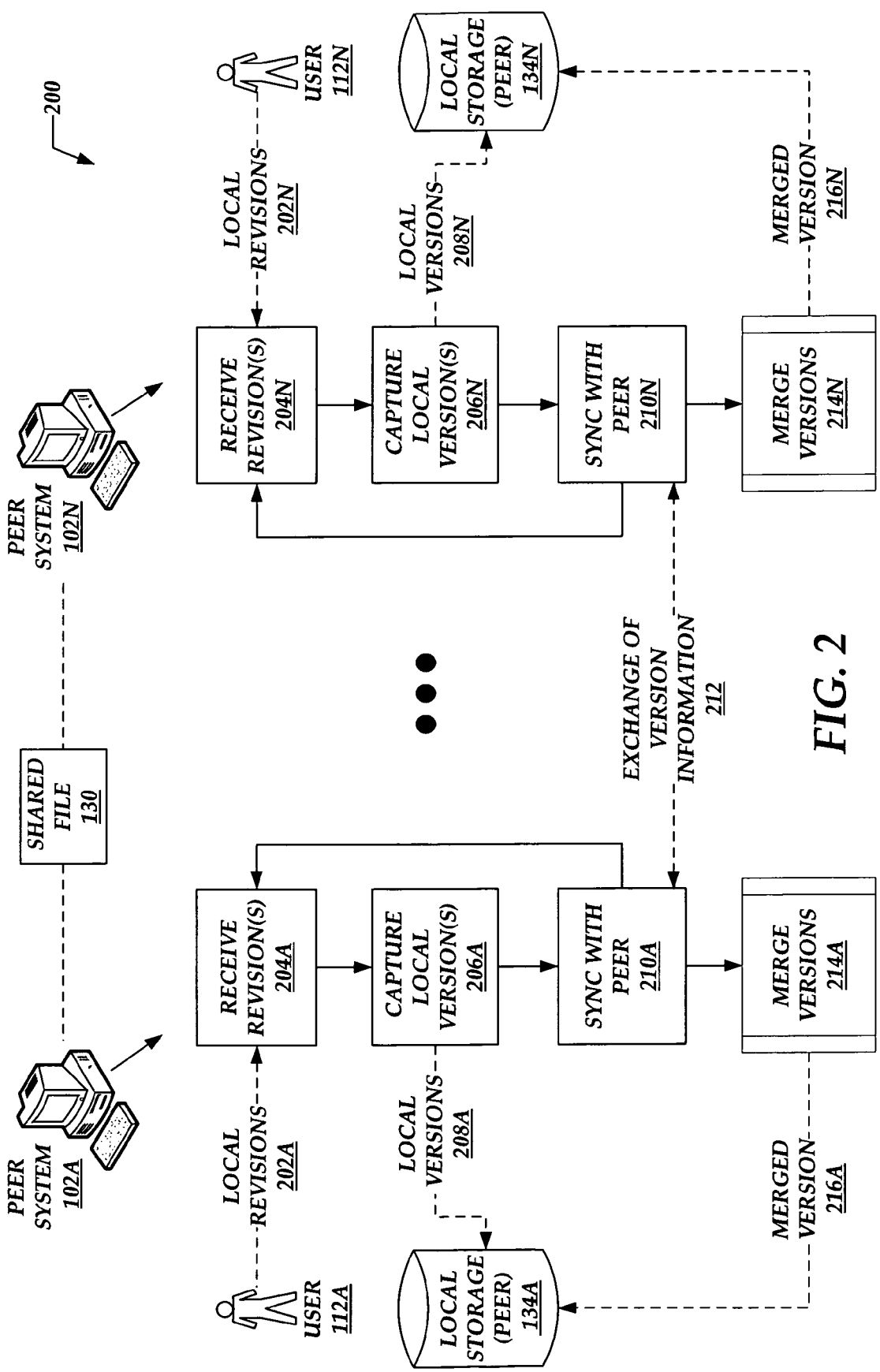
FIG. 2 is a combined block and flow diagram illustrating components and data flows by which various peer systems may receive, store, and merge revisions to files shared across those peer systems for collaborative editing.

Before proceeding to FIG. 2 and the subsequent drawings, the following definitions are presented, to facilitate this description, but not to limit possible implementations. The term "version" may refer to a complete state of a document or file at some point in time. The term "revision" may refer to a particular change or set of changes that cause a new version to be generated. Implementations of this description may store versions, which in turn may be encoded as sets of revisions, as appropriate in different implementations.

FIG. 2 illustrates components and data flows, denoted generally at 200, by which various peer systems may receive, store, and merge revisions to files shared across those peer systems for collaborative editing. For ease of reference and description, but not to limit possible implementations, FIG. 2 may carry forward some reference numbers from previous drawings to refer to similar items. For example, FIG. 2 carries forward representations of the peer systems 102a and 102n, the example users 112a and 112n, and the local storage elements 134a and 134n.

Turning to FIG. 2 in more detail, a given peer system (e.g., the peer system 102a) may enable a corresponding user 112a to provide any number of revisions or edits 202a and 202n (collectively, revisions 202) to a given shared file (e.g., 130) being collaboratively edited at least on the peer systems 102a and 102n. Edits or revisions to the shared file 130 may occur locally on the peer system 102a, on the peer system 102n, or on other peer systems. Blocks 204a and 204n (collectively, blocks 204) in FIG. 2 generally represent receiving these revisions from the user 112a, with these revisions 202 providing examples of the interactions 114 shown in FIG. 1.

In turn, blocks 206a and 206n (collectively, blocks 206) generally represent generating and capturing versions of the shared document or file, with these captured versions incorporating various revisions made locally at the peer systems 102a and 102n. Blocks 206a and 206n may also include storing representations of these versions in the local storage elements 134a and 134n, with FIG. 2 representing at 208a and 208n the file versions captured locally at the peer systems 102a and 102n, respectively. In general, versions may be captured locally to incorporate any number of revisions as they occur over time at the peer systems 102a and 102n.

The revisions and versioning represented in blocks 204 and 206 may occur on any number of peer systems 102 over time, with these operations proceeding on different peer systems 102 generally in parallel. However, these operations may not occur necessarily concurrently or simultaneously relative to one another, because peers may go online or offline at arbitrary times.

At any convenient times, two or more peer systems 102 may establish relationships with one another, with these relationships enabling the peer systems to sync versions with one another blocks 210a and 210n (collectively, blocks 210) as shown in FIG. 2 represents processing performed respectively on the peer systems 102a and 102n to establish this sync relationship. In turn, the peer systems 102 may exchange version information with one another, as represented generally at 212. More specifically, the bidirectional dashed arrow 212 may represent the peer system 102a sending representations of the local versions 208a to the peer system 102n, and may represent the peer system 102n sending representations of the local versions 208n to the peer system 102a. Sync relationships established between peer systems may enable bidirectional syncs and/or unidirectional syncs. For example, a unidirectional sync may include an updated file emailed from one peer to another.

In general, sync operations refer to two or more peer systems exchanging version information, as formerly captured and represented respectively on the individual peer systems. Once the sync operation is complete between two or more given peer systems, at least some (but not necessarily all) of the peers may contain a complete copy of the version history as combined across all peer systems involved in the sync operation. In some scenarios, complete or incomplete version history may flow in one or both directions between two or more of the peers.

Once the peer systems 102a and 102n have synced with one another and exchanged their version information, these peer systems 102 may then proceed with respective operations to merge this version information, as denoted respectively at blocks 214a and 214n (collectively, blocks 214). In general, the peer systems 102a and 102n may perform these merge operations individually and independently from one another, to create merged versions 216a and 216 (collectively, merged versions 216).

FIG. 2 illustrates a pairwise merge occurring between the two peer systems 102a and 102n only for clarity of illustration and convenience of description. However, implementations of this description may perform sync and merge operations occurring between two or more peer systems without departing from the scope and spirit of this description.

Having described the components and data flows 200 by which various peer systems may receive, store, and merge revisions to shared files in FIG. 2, the discussion now turns to a more detailed description of version history information as it may be stored by various peer systems. This description is now provided with FIG. 3.

Figure 3:
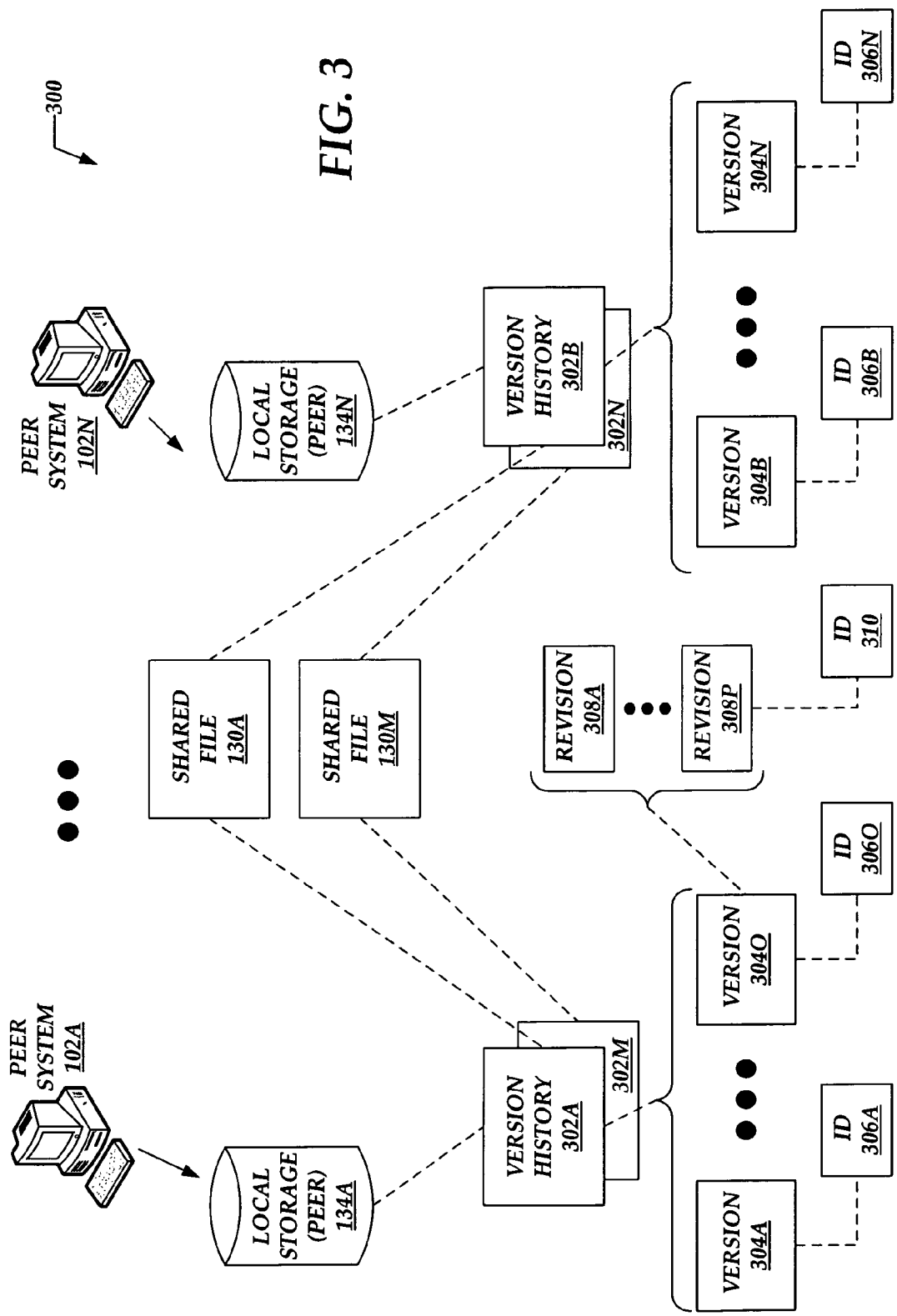
FIG. 3 is a block diagram illustrating data structures and hierarchies by which various peer systems may maintain version history information related to various shared documents.

FIG. 3 illustrates data structures and hierarchies, denoted generally at 300, by which various peer systems may maintain version history information related to various shared documents. For ease of reference and description, but not to limit possible implementations, FIG. 3 may carry forward some reference numbers from previous drawings to refer to similar items. For example, FIG. 3 carries forward representations of the peer systems 102a and 102n. FIG. 3 also carries forward examples of shared files 130a and 130m that may be edited collaboratively by the peer systems, and the local storage elements 134a and 134n, which may store revisions made to the shared files 130 using the peer systems.

Turning to FIG. 3 in more detail, more specifically to the example peer system 102a, the local storage elements 134a may store version history records 302a and 302m that correspond respectively to the shared files 130a and 130m. For example, the version history record 302a may store representations of any number of individual versions of the shared file 130a. FIG. 3 illustrates two examples of such versions at 304a and 304o (collectively, versions 304), but implementations of the local storage 134a may include representations of any number of versions. In turn, these individual versions may represent or incorporate any number of particular revisions stored locally on the peer system 102a.

FIG. 3 also illustrates examples of particular revisions at 308a and 308p (collectively, revisions 308). While FIG. 3 illustrates these revisions as associated with the individual captured version 304o, it is noted that any of the individual version records 304 may contain any number of individual revision records 308.

Individual versions 304 and/or revisions 308 may be associated with respective identifiers, with FIG. 3 illustrating example identifiers at 306a and 306o (collectively, identifiers 306). More specifically, some implementations may assign unique identifiers to the versions 304 and the revisions 308. However, other implementations may assign unique identifiers to the versions, and derive unique identification for the revisions from the version identifiers, and vice versa. FIG. 3 shows an example unique identifier 310 associated with the revision 308p.

In example implementations, the identifiers 306 and 310 are globally unique identifiers (GUIDs). It is also noted that these identifiers are unique to a given version, rather than a specific machine. For example, a given version may be created independently on two different machines by a merge process (described below) merging the same past version history information on the two machines. This given version would have the same unique identifier. This affects how those unique identifiers are created. These identifiers 306 may indicate or designate particular instances of stored versions for the purposes of merging the versions, or merging the revisions represented in those versions. These identifiers may also be used to resolve conflicts arising in various versions or revisions. For example, conflicts may arise when different users attempt to revise different portions of a shared file 130 to contain different or contradictory information.

Turning to the peer system 102n in more detail, the local storage elements 134n may store version history records 302b and 302n representing versions generated and stored on the peer system 102n. In the example shown in FIG. 3, the version history record 302b may store revisions to the shared file 130a occurring on the peer system 102n, while the version history record 302n may store revisions to the shared file 130m occurring on the same peer system.

The version history records 302b and 302n may also contain any number of representations of particular versions that are captured and stored on the peer system 102n. For example only, but not to limit possible implementations, FIG. 3 illustrates two examples of individual instances of versions, denoted at 304b and 304n. In addition, these version instances 304b and 304n may be associated with respective identifiers 306b and 306n.

It is noted that version histories as stored on different peers may or may not be linear in nature. For example, version histories may be represented, or visualized, as having tree-like structures. These tree structures may include forks, branches, or other features, depending on from where in the version history a given peer branches its revisions.

Having described the data structures and hierarchies 300 and FIG. 3, the discussion now turns to a description of processes for merging versions between two or more peer systems. This discussion is now presented with FIG. 4.

Figure 4:
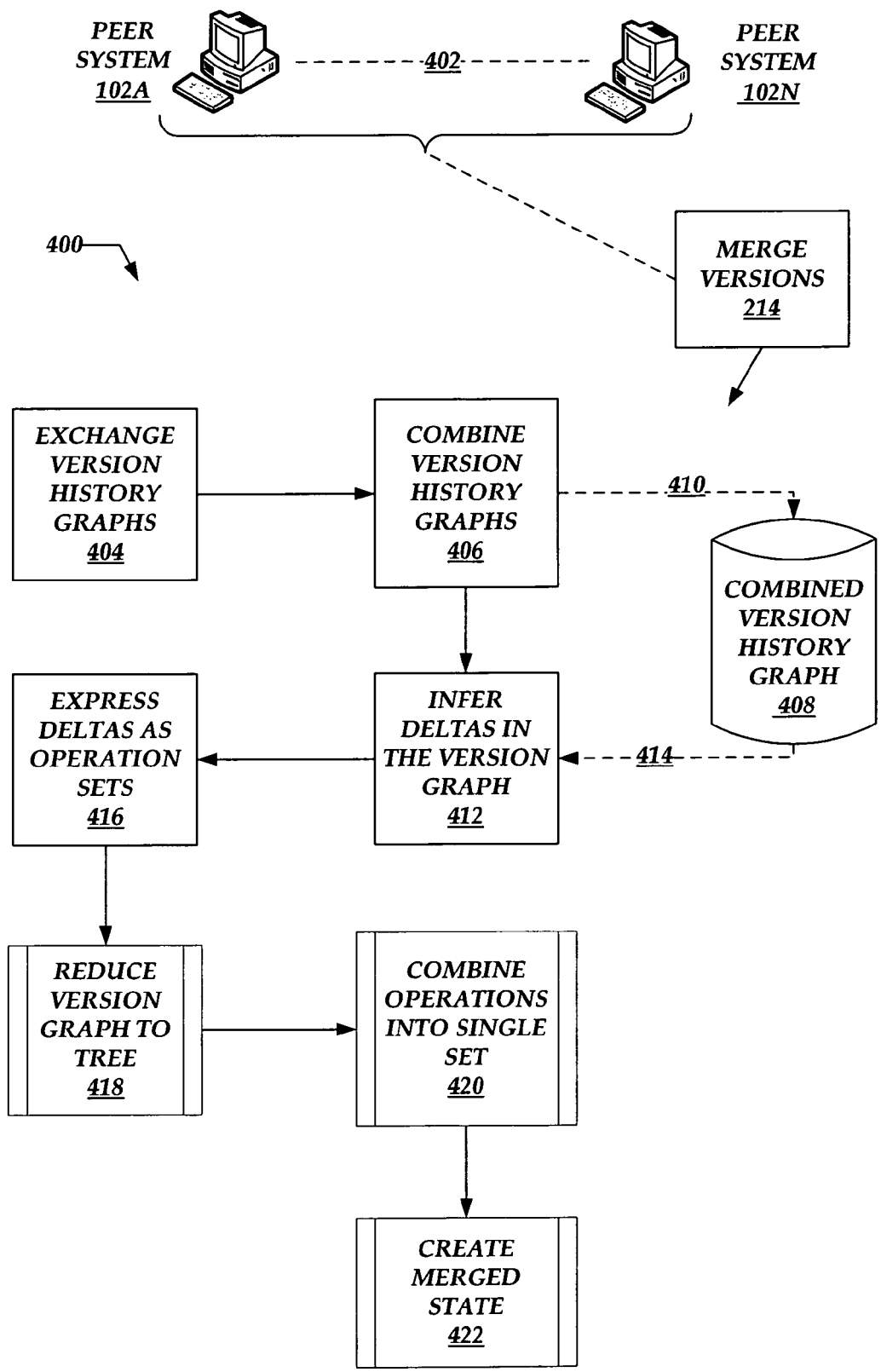
FIG. 4 is a flow diagram illustrating processes for merging versions of documents using multiple masters.

FIG. 4 illustrates flows, denoted generally at 400, by which two or more peer systems may merge revisions that occurred locally on these peer systems. For ease of reference and description, but not to limit possible implementations, FIG. 4 may carry forward some reference numbers from previous drawings to refer to similar items. For example, FIG. 4 carries forward examples of the peer systems at 102a and 102n (collectively, peer systems 102). FIG. 4 also carries forward at 214 a representation of a merge process that may be performed individually and independently on the peer systems 102.

For convenience of description only, the process flows 400 are discussed in connection with the peer systems 102a and 102n. However, it is noted that implementations of this description may perform these process flows in connection with other systems, without departing from the scope and spirit of this description.

As shown in FIG. 4, the peer systems 102 are assumed to have established a synchronization relationship between themselves, as represented generally at 402. This synchronization relationship 402 may enable the peer systems 102 to exchange version information with each other, as represented in FIG. 2 at 212. In turn, the processes 400 may enable the peer systems 102 to merge these versions.

When two or more peer systems connect to one another to synchronize, these peer systems may each contain different version history graphs of the same file. However, despite the differences between the version history graphs, new versions are globally unique, and thus do not conflict. Some portions of these history graphs may be shared, but other portions of these graphs may be independent and not shared between the two peer systems. As represented in block 404, the peer systems may share or exchange representations of their version history graphs. In turn, block 406 represents combining these graphs to create a graph containing a complete version history, incorporating revisions made by either of the synchronized peer systems. FIG. 4 provides an example of a combined version history graph at 408, with data flows into the combined version history graphs represented at 410.

Figure 9:
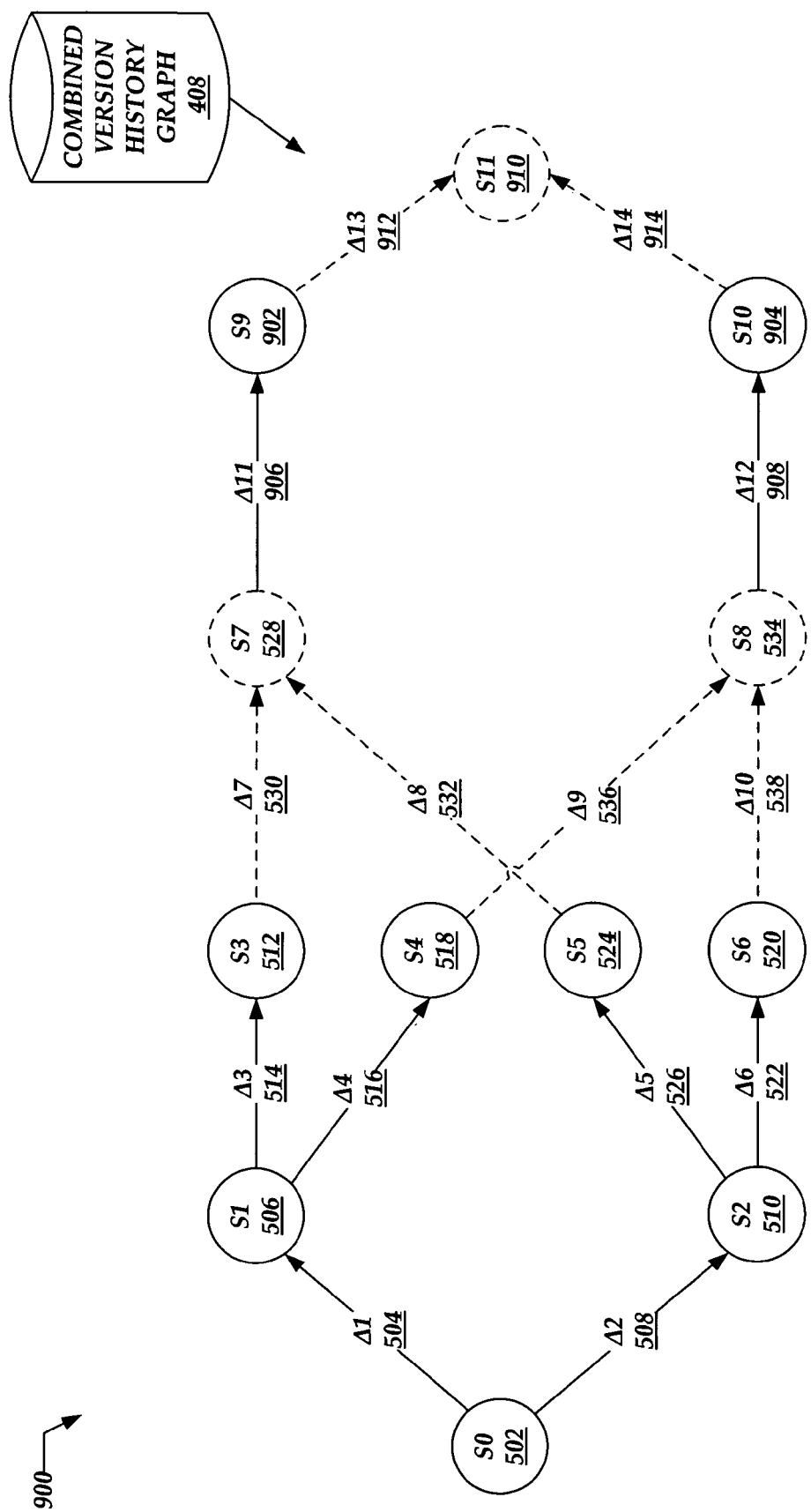
FIG. 9 is a state diagram illustrating another example of the combined version history graph.

It is noted that up to this point in the process flows 400, the version history graph 408 is not yet merged. Put differently, although the synchronized peer systems 102a and 102n are now aware of what revisions have occurred locally on the other peer systems, these revisions have not yet been reconciled into a common version shared across these two peer systems. For an example visual representation of how an unmerged version history may appear, FIG. 9 provides such an example, if the elements designated at 910, 912, and 914 are disregarded.

The version history of shared files or documents (e.g., 130 in FIG. 1) may be stored and represented using a variety of different techniques. For example, a given shared file or document (collectively, a "shared file") may be revised by a plurality of different peer systems 102. As these revisions occur, the peer systems may create state representations of the shared file. in some, but not necessarily all cases, the peer systems may create and store representations of changes involved in transitioning the shared document from one state to another, referred to herein as "deltas".

In cases in which the peer systems store only state representations of the shared document, the combined version history graph 408 may contain these state representations. Block 412 represents extracting these state representations from the combined version history graph 408, as represented at 414. Block 412 may also include inferring the deltas associated with the various state representations contained within the version graph, assuming that those deltas are not already stored in the version graph. In turn, block 416 represents expressing these deltas in terms of one or more particular operations. For example, the peer systems may change the value of a given object within the shared document, with changes in the value of this object resulting in new states of the shared document. In this example, the version graph may track the values of this given object as associated with these different states. In such a scenario, block 416 may include identifying what operations at the peer systems resulted in the value of the given object at a given state.

Block 418 represents reducing the version graph to form a version tree. Assume, for example, that the version graph 408 is implemented as a directed acyclic graph. An example of the version graph 408 shown in FIG. 5, which is now described before returning to continue the description of FIG. 4.

Figure 5:
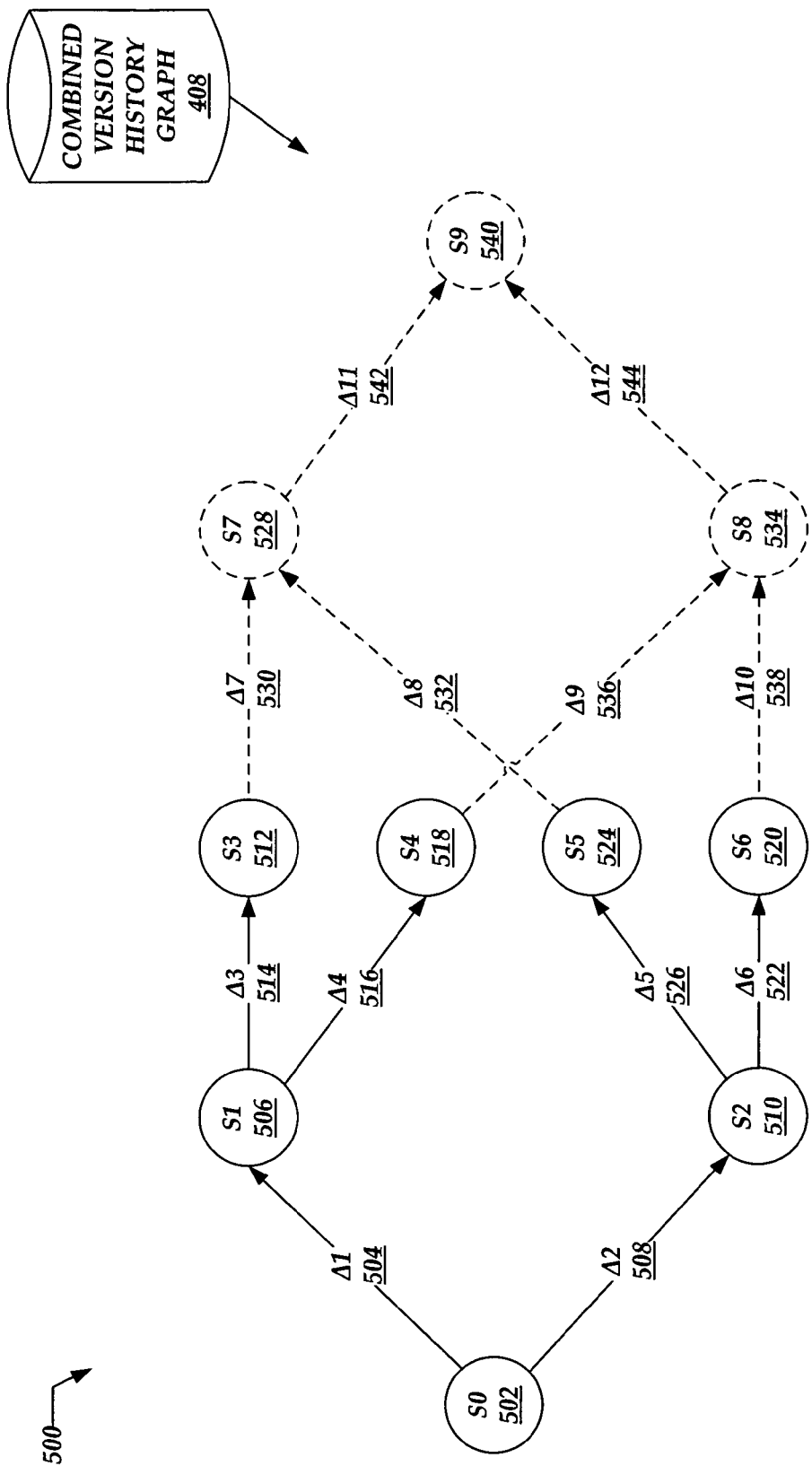
FIG. 5 is a state diagram illustrating an example of a combined version history graph.

FIG. 5 is a state diagram, denoted generally at 500, that provide an example of the version history graph 408 shown in FIG. 4. This state diagram 500 illustrates a sequence of states through which a given document or file may pass as it is collaboratively edited by a plurality of peer systems (e.g., 102a and 102n as shown in FIG. 1). FIG. 5 is described in connection with a given object, labeled "X", which changes value in response to various actions taken by different peer systems. In this diagram, states resulting from changes made by users are represented by solid circles, and vectors resulting from user changes are shown as solid arrows transitioning between two states. States resulting from system-calculated merge operations are shown in dashed outline, and vectors between states that are calculated in connection with these merge operations are shown as dashed arrows transitioning between two states.

A state 502, designated as state S0, may represent an initial state of the shared document. In this initial state, the object X is assumed to have an initial value of 0. A first peer system (e.g., 102a) may change the shared document, as represented by a vector 504, designated as Δ1. The vector 504 represents a state transition from the state 502 to a new state 506, designated as state S1.

Another peer system (e.g., 102n) may also receive the shared document in its initial state 502, and users of this peer system may change the shared document, as represented by a vector 508 (designated Δ2). This vector 508 represents a transition from the initial state 502 to a new state 510, designated as state S2.

From the state 506 (S1), subsequent user changes made at the first peer system may transition from the state to a new state 512, designated as state S3. The changes (or deltas) between the states 506 and 512 are represented by a vector 514, designated as Δ3.

A user at another peer system may receive the document in the state 506 (S1), and may change the document, as represented generally by a vector 516 (designated as Δ4). These user changes may transition the document from the state 506 (S1) to a new state 518 (S4).

From the state 510 (S2), a user at the second peer system may change the document from the state to a new state 520 (S6). The user changes transitioning the document from the states 510 to 520 are represented by a vector 522 (Δ6).

Also from the state 510 (S2), a user at another peer system may receive the document in this state, and may change it, resulting in a transition from the state 510 to a new state 524 (S5). The user changes transitioning the document from the states 510 to 524 are represented by a vector 526 (Δ5).

In the example shown in FIG. 5, the shared document may be in four different states (i.e., 512, 518, 520, and 524) on four different peer systems at a given time. Assume, for example, that the states 512 (S3) and 524 (S4) are to be merged. To accomplish this merge, the merge processes described herein may create a system-generated new state 528 (S7). In addition, these merge processes may create new vectors 530 and 532. The vector 530 represents system-generated changes, designated as Δ7, transitioning from the state 512 (S3) to the new merged state 528 (S7). Similarly, the vector 532 represents system-generated changes, designated as Δ8, transitioning from the state 524 (S5) to the new merged state 528 (S7).

In another merge example, assume that the states 518 (S4) and 520 (S6) are to be merged into a new, system generated state 534 (S8). New vector 536 represents system-generated changes, designated at Δ9, transitioning from the state 518 (S4) to the new state 534 (S8). Similarly, new vector 538 represents system-generated changes, designated at Δ10, transitioning from the state 520 (S6) to the new state 534 (S8).

Having created the new merged states 528 (S7) and 534 (S8), another merge example may create a new, system-generated state 540 (S9). A system-generated vector 542 represents system-generated changes, designated at Δ11, transitioning from the state 528 (S7) to the new state 540 (S9), while a system-generated vector 544 represents system-generated changes, designated at Δ12, transitioning from the state 534 (S8) to the new state 540 (S9).

Taking the version history topology shown in FIG. 5 as an example, assume that an object X starts with a value of 0 at the state 502 (S0). in this example, assume that the change vector 504 (Δ1) changes the value of the same object X to 1, and that the change vector 514 (Δ3) resets the value of the same object X back to 0.

In visually inspecting the topology shown in FIG. 5, it is apparent that the value of the object X should be zero, because this was the last deliberate user edit of the object X made with full knowledge of earlier changes. however, processing the topology shown in FIG. 5 all the way through to state 540 (S9) using a typical 3 way merge process with common base for each merge point results in the following table:

change vector Δ2 changes the object Y to have a value of 1, and that the change vector Δ6 resets the value of the object Y back to 0. In this example including both of the objects X and Y, when calculating the values of X and Y in connection with the merge represented at the state 540 (S9), the correct value for Y (i.e., 0) results only if the state 510 (S2) is chosen as the basis for the merge. However, as indicated in the table above, a different state (i.e. the state 506 (S1)) was chosen to obtain the correct value for the object X.

As the above example illustrates with the example topology shown in FIG. 5, it may be problematic to identify a single state to serve as the basis for merging the states of different objects in a three-way state-based merge. In the example topology shown in FIG. 5, the topological property that causes the foregoing conflict between the objects X and Y is the "crossover" between the change vectors 532 and 536 (i.e., represented respectively as Δ8 and Δ9). More complex scenarios and topologies may provide further problematic scenarios.

The discussion now returns to describing processes for handling the merge to address this issue. As discussed above, the combined version history graph 408 may be implemented as a directed cyclic graph that may be reduced to a tree representation by removing some of the change or delta vectors. The solid and dashed arrows shown in FIG. 5 provide examples of such change or delta vectors. The discussion of FIG. 4 now resumes with block 418, which represents reducing the version graph to a tree representation. To promote

| States | Value of X | Comments |
|---|---|---|
| S0 | 0 | |
| S1 | 1 | |
| S2 | 0 | |
| S3 | 0 | |
| S4 | 1 | |
| S5 | 0 | |
| S6 | 0 | |
| S7 | 0 | X is 0 in both S3 and S5, which are merged to form S7. So X would retain the value 0. |
| S8 | 1 | S8 is the result of merging S4 (in which X is 1) and S6 (in which X is 0). The result of the merge depends on what is selected as the common base ancestor. From S8, tracing back through the vector paths, the only common point between S4 and S6 is S0. In the base S0, X is 0. In this case, the result of the three way merge is 1, because it is inferred that X was set to 1 in one of the current states, and not the other. |
| S9 | 1 if S0 base / 1 if S2 base / 0 if S1 base | S9 is the result of merging S7 (where X is 0) and S8 (where X is 1). In this state, it is no longer clear which base should be used in the merge, because more than one common base point is available. From S9, tracing back along the vector paths, possible common base points appear at S0, S1 or S2. Based on visual inspection, the correct value for S9 (X is 0) results only if S1 is selected as the base for the merge. |

The foregoing example may suggest that all multi-master merges may be handled in a three-way merge approach, by carefully selecting the appropriate base for the three-way merge as described in the comments in the last step. However, extending the above example illustrates that some three-way merges may remain problematic, regardless of which base is chosen for the merge. For example, in addition to the object X featured in the previous example, consider another object Y that has an initial value of 0 at state S0. Assume that the clarity of illustration, FIG. 6 elaborates further on illustrative processing that may be performed by block 418, as now described.

Figure 6:
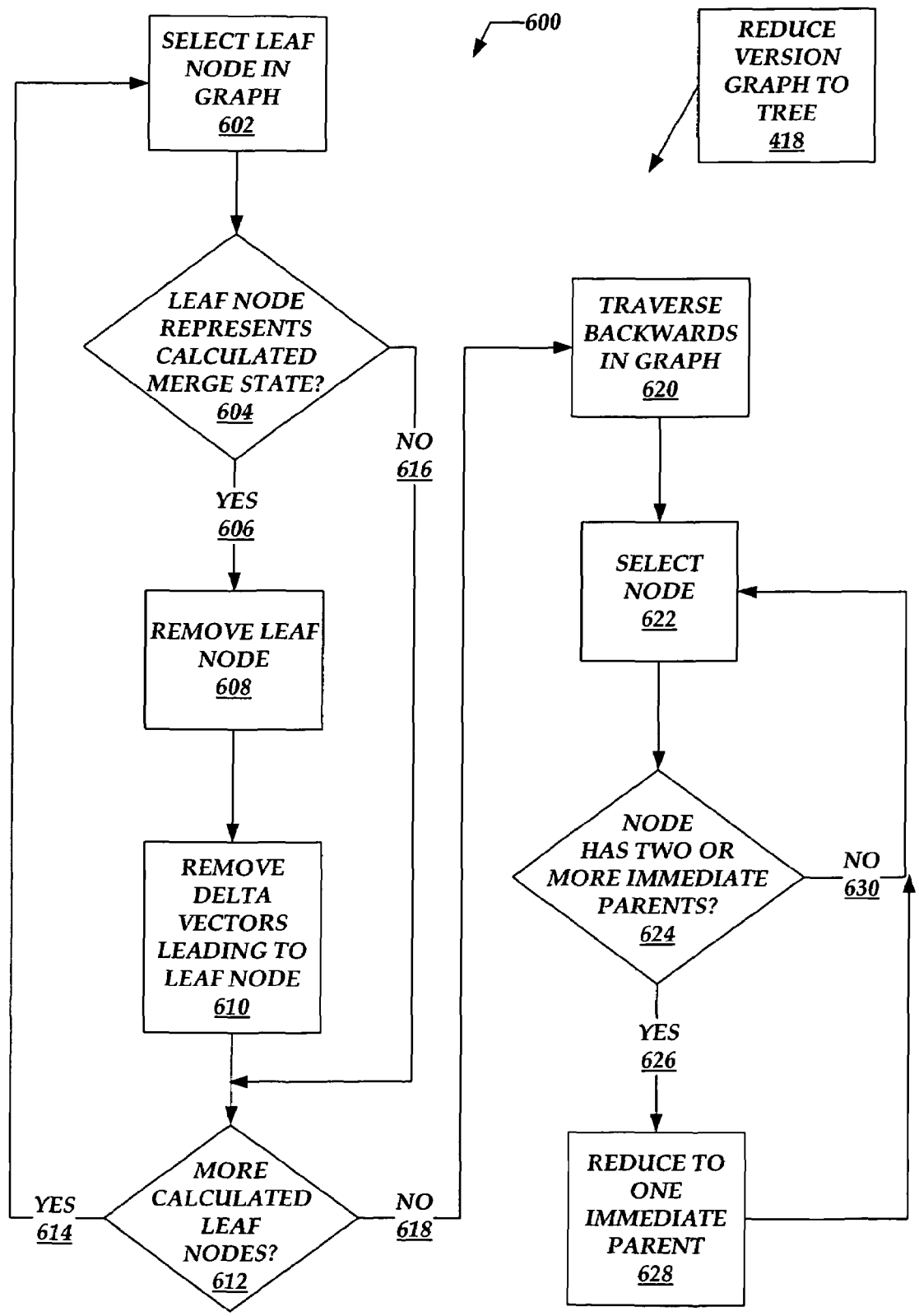
FIG. 6 is a flow diagram illustrating processes for reducing the combined version history graph to a tree representation.

FIG. 6 illustrates process flows, denoted generally at 600, related to reducing the version graph to a tree representation. Without limiting possible implementations, FIG. 6 may be understood as elaborating further on block 418 shown in FIG. 4, described with reference to the example topology shown in FIG. 5.

Turning to FIG. 6 in more detail, block 602 represents selecting a given leaf node within the version graph. FIG. 5 provides an example of such a leaf node at 540 (S9). In turn, decision block 604 represents determining whether the selected leaf node represents a system-calculated merge state. In the notational convention used in FIG. 5, system-calculated merge states (and related change vectors) are shown in dashed outline. More particularly in FIG. 5, the states 528 (S7), 534 (S8), and 540 (S9) represent examples of system-calculated merge states.

From decision block 604, if the selected leaf now represents a system-calculated merge state, the process flows 600 may take Yes branch 606 to block 608, which represents removing the selected leaf node from the version graph. In turn, block 610 represents removing the delta vectors leading to the removed leaf node.

Decision block 612 represents determining whether the version graph contains any additional system-calculated leaf nodes. Put differently, decision block 612 represents determining whether all leaf nodes remaining in the version graph are fixed states that resulted from actually user input, as distinguished from leaf nodes generated by merge processes. In the notation used for FIG. 5, fixed states and related change vectors are shown in solid outline.

From decision block 612, the version graph contains additional system-calculated leaf nodes, the process flows 600 may take Yes branch 614 to return to block 602. As described above, block 602 represents selecting another leaf node in the version graph. In turn, the process flows 600 may repeat decision block 604 for the newly-selected leaf node.

From decision block 604, if the leaf node does not represent a system-calculated merge state, the process flows 600 may take No branch 616, which bypasses block 608 and 610 to reach decision block 612. From decision block 612, if the version graph does not contain any additional system-calculated leaf nodes, the process flows 600 may take No branch 618 to block 620. Block 620 represents traversing from the leaf state nodes backward up the version graph. In the example tree topology shown in FIG. 5, block 620 may include selecting one of the states 512 (S3), 518 (S4), 524 (S5), or 520 (S6). In turn, block 622 represents selecting one of these nodes (e.g., 512, 518, 524, or 520).

Decision block 624 represents determining whether the selected node has two or more immediate parents. From decision block 624, if the selected node has two or more immediate parents, the process flows 600 may take Yes branch 626 to block 628, which represents removing all but one delta vector from the parent nodes. Put differently, block 628 represents reducing the number of parents associated with the selected node to one.

Implementations of the process flows 600 may use any number of techniques to determine which delta vector to retain in block 628. For example, assuming that unique identifiers are associated with the delta vectors, block 628 may include retaining the delta vector having the lowest unique identifier. In general, any approach may be suitable that is uniquely deterministic for all peer systems involved with collaboratively editing a given shared file or document.

FIG. 9 illustrates graph topologies, denoted generally at 900, that illustrate additional scenarios for merge processes performed by two or more peer systems. Without limiting possible implementations, and only for ease of reference, FIG. 9 carries forward elements 502-538 from FIG. 5. However, FIG. 9 illustrates two additional states 902 (designated at S9) and 904 (designated at S10). Turning first to the state 902, this state represents a user-created edit of the merge state 528 (S7). FIG. 9 illustrates a change vector representing edits made by the user at 906, as designated at Δ11.

Regarding the state 904, this state represents a user-created edit of the merge state 534 (S8). FIG. 9 illustrates a change vector representing edits made by the user at 908, as designated at Δ12. Unlike the graph topologies shown in FIG. 5, the topologies shown in FIG. 9 illustrate user edits (i.e., 906 and 908) that occur after system-created merge states (i.e., states 528 and 534).

Referring to FIG. 9 (a variant of the example shown in FIG. 5), blocks 604-612 may remove the state 910 (S11), and related change vectors 912 (Δ13) and 914 (Δ14). In turn, blocks 620-628 would remove the change vectors 532 (Δ8) and 538 (Δ10). In this example, once the change vectors 532 and 538 are removed, the "crossover" between the change vectors 532 and 536 disappears from the topology shown in FIG. 9. As detailed further below, removing the "crossover" between these two change vectors would address the problematic scenario described above in connection with the objects X and Y.

Afterwards, the process flows 600 may return to block 622 to select another node. Returning briefly to decision block 624, if the selected node does not contain two or more immediate parents, the process flows 600 may take No branch 630 to return to block 622.

Having described the process flows 600 shown in FIG. 6, several observations are noted. First, the leaf nodes and delta vectors removed in blocks 608, 610, and 628 were system-generated nodes and vectors, created in connection with merging states. Therefore, block 608, 610, and 628 do not remove user-created edits or revisions made to the document shared between the peer systems, but instead remove system-inferred nodes and vectors created during merge operations. Second, the changes made to the graph topology shown in FIG. 9 are temporary and made for the purposes of the merge algorithm. However, these changes are not permanent alterations to the history graph.

Having described the process flows 600 in FIG. 6, elaborating further on block 418 in FIG. 4, the discussion now returns to FIG. 4 to resume discussing the merge algorithm. More specifically, block 420 in FIG. 4 represents combining delta operations that result from user actions into a single operation set. To promote clarity of illustration, FIG. 7 elaborates further on illustrative processing represented by block 420.

Figure 7:
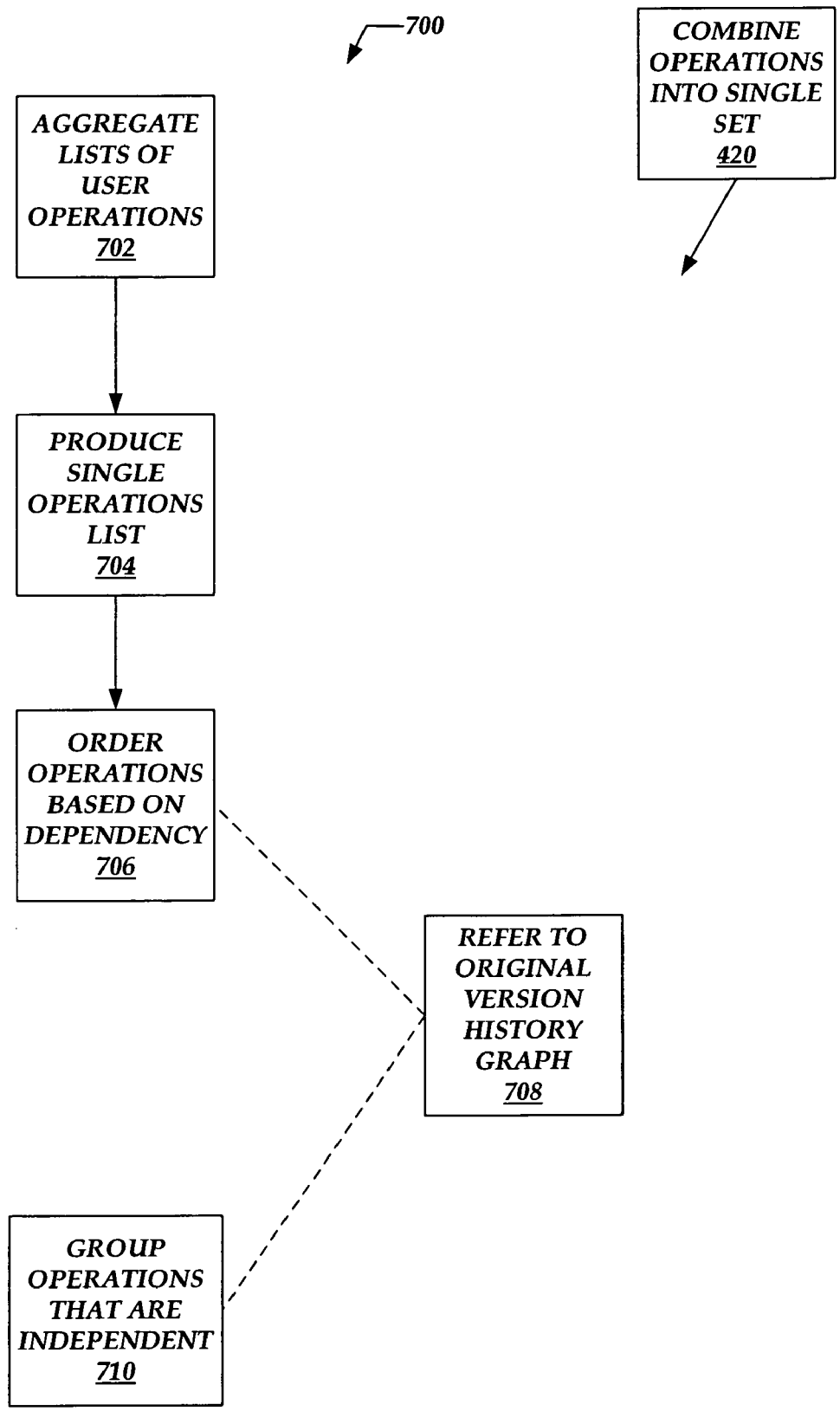
FIG. 7 is a flow diagram illustrating processes for combining operations represented in the tree into a single set.

FIG. 7 illustrates process flows, denoted generally at 700, for combining user operations into a single set. Without limiting possible implementations, FIG. 7 may be understood as elaborating further on block 420 shown in FIG. 4, described with reference to the example topology shown in FIG. 9.

Turning to the process flows 700 in more detail, block 702 represents aggregating a list of all user-created delta operations represented within the reduced version tree output from block 418. In turn, block 704 represents producing a single list of operations, excluding inferred merge deltas (e.g., 530, 532, 536, and 538 in FIG. 9).

Block 706 represents ordering the list or table of operations. Some operations in this list or table may depend on earlier or previous operations. For the purposes of this description, but not to limit possible implementations, a given operation is "dependent" on another operation if the given operation was performed with knowledge of the other operation. The other operation occurs in the version history graph before the given operation. Assuming that the given operation and the other operations are represented as Δx and Δy, respectively, if any path from Δx passes through Δy back to the root of the version history graph, then the operations in Δx are dependent on Δy. There may be multiple paths back through the graph, so Δx may depend on several previous operations, in addition to Δy.

Block 706 may include ordering the list or table of operations to account for such dependencies, such that operations dependent on previous operations appear in the list after such previous operations. Block 708 represents referring to the original version of the history graph (e.g., 408 in FIGS. 4 and 5), as opposed to the reduced tree representation output from block 418, in connection with performing block 706.

Block 710 represents grouping together any independent operations that are performed on the same object or dependent objects. Assuming that these operations are independent and made without knowledge of one another, these operations may potentially conflict with one another. Returning to the previous definitional example involving operations represented at Δx and Δy, topologically, if no path from Δx passes through Δy back to the root of the version history graph, then the operations represented in Δx are independent of the operations represented in Δy. For example, referring back to the examples above regarding the values of the objects X and Y, operations performed on different peer systems may assign conflicting values to these objects. Block 710 may include referring to the original version history graph, as represented at block 708.

If these independent operations conflict with one another, implementations of this description may employ various different approaches to resolve such conflicts. In addition, the grouping performed in block 710 may contribute to the efficiency of such conflict resolution. Block 710 may apply deterministic rules to order the operations included within different groupings. For example, block 710 may include ordering operations based on unique identifiers associated with these operations. For example, as detailed further below, one example of a globally deterministic rule for resolving conflicts may state that the operation from the delta with the lowest unique identifier wins over another delta having a higher unique identifier.

Having described the process flows 700 in FIG. 7 for combining operations into a single set, the discussion now returns to FIG. 4, to continue with the description of the merge algorithm. Referring back to FIG. 4, block 422 represents creating a merged state from the single operation set output from block 420. To promote clarity of illustration, FIG. 8 elaborates further on illustrative processing represented in block 422.

Figure 8:
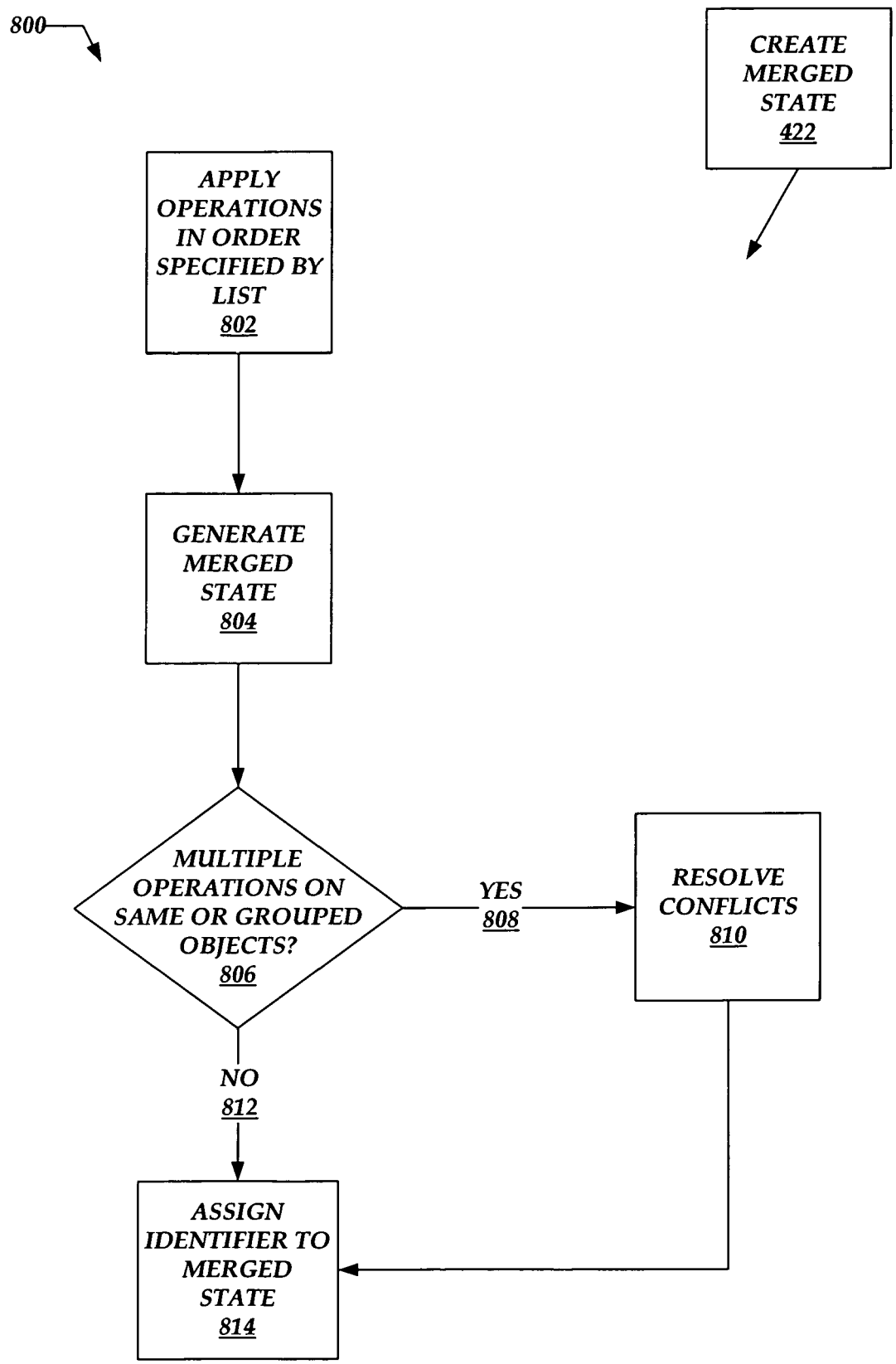
FIG. 8 is a flow diagram illustrating processes for creating a merged state in response to merging two or more version histories.

FIG. 8 illustrates process flows, denoted generally at 800, for creating a merged state based upon the single set or list of operations output from block 420 in FIG. 4. Without limiting possible implementations, FIG. 8 may be understood as elaborating further on block 422 shown in FIG. 4, described with reference to the example topology shown in FIG. 9.

Turning to the process flows 800 and more detail, block 802 represents applying the operations in the order specified by the list output from block 420. In turn, block 804 represents generating the merged state as a result of performing the operations specified in the list.

Decision block 806 represents evaluating whether multiple operations are performed on the same or group of objects. As described above, this scenario may result in conflicting operations being performed on these objects. From decision block 806, if conflicting operations are performed on such objects, the process flows 800 may take Yes branch 808 to block 810, which represents resolving any conflicts.

Depending on the circumstances of particular implementations, any number of different conflict resolution techniques may be appropriate. Particular conflict resolution strategies are not detailed herein, aside from noting that in general, all peer systems participating in merge operations employ the same globally deterministic strategies for resolving conflicts.

In addition, the examples of conflict resolution algorithms described herein operate only on state information from the version history graph, and are deterministic when operating on version history data shared between the peer systems described herein. For example, if two or more delta changes edit the same object, then these edits may conflict. In some cases, the delta changes may be associated with unique identifiers (e.g., a globally unique identifier, or GUID). In such scenarios, the delta change that is associated with the lowest unique identifier may "win" the conflict. In another example of a globally deterministic rule for conflict resolution, "edit" operations may take precedence over "delete" operations. In other scenarios, conflicts may be queued for user resolution.

From decision block 806, if the output of this decision is negative, the process flows 800 may take No branch 812 to block 814, which represents assigning a unique identifier to the merged state generated in block 804. Preferably, this unique identifier is identical across any peer systems calculating the merge state, and results from merge processes that generate the same identifiers deterministically when operating on different peer systems. These approaches may be more efficient than other approaches that generate different identifiers for merges occurring on different peer systems, and then investigate the lineage of these different merged versions to determine whether they are the same or equivalent. For example, referring briefly to FIG. 9, assume that at least two different peer systems are calculating the merged state 528 (S7), which represents the merger of the states 512 (S3) and 524 (S5). In this scenario, the identifier assigned in block 814 would be identical across these two peer systems.

In some implementations, block 814 may include calculating the identifier for the merge state using a well-behaved hash function, which operates on identifiers associated with all states and/or delta changes participating in the merge. However, other techniques for calculating the identifier for the merge state may be appropriate in other applications, provided that the techniques are applied consistently and uniformly across the peer systems participating in the merge, and operate only on data or information shared between the peer systems. As shown in FIG. 8, the process flows 800 may also reach block 814 after resolving any conflicts in block 810.

The above merge algorithm is now described with the following example operations performed on objects X, Y, and Z:

| Object | Operation No. | Operation |
|---|---|---|
| | Operations in Δ1 | |
| X | 1 | Set to 1 |
| Z | 2 | Set to 1 |
| | Operations in Δ2 | |
| Y | 3 | Set to 1 |
| Z | 4 | Set to 2 |
| | Operations in Δ3 | |
| X | 5 | Set to 0 |
| | Operations in Δ12 | |
| Z | 6 | Set to 3 |

For the purposes of this example, assume that the other deltas contain no operations on the objects X, Y, and Z or their dependents (i.e. the other deltas are independent operations performed on other objects). Using the merge graph topology shown in FIG. 9, a new merged state 910 (S11) may represent merging the states 902 and 904. System-created deltas 912 (Δ13) and 914 (Δ14) respectively transition from states 902 and 904 to the new merged state 910.

The creation of the merged state 910 (S11) as represented by the following notation, in which forks in the version graph are represented by commas, and user-created states that occur sequentially in the version graph also occur sequentially in the notation:

S11 (the merged result state)=(Δ1 (Δ3 Δ11, Δ4 Δ12), Δ2 (Δ5, Δ6))

Aggregating these delta operations into a table according to the algorithm described above results in the following table. More specifically, this table represents aggregating all of the operations from the deltas above. Afterwards, the delta operations are ordered, such that any operations dependent on earlier operations appear after them in the table. Any independent conflicting operations are ordered such that operations having higher precedence (i.e., the operation that "wins" the conflict) appears after operations having lower precedence. For convenience, the table below groups these operations by the object on which the operation was dependent.

object being added). Then, operation 6 is applied to set the value to 3. Operation 6 is serially dependent on both operations 4 and 2 (actually the merged state containing them), and sets the value to 3, so Z is 3 in the merged state 910; and Object Y: its value is set to 1 by operation 3, and there are no conflicting operations on this object, so its value remains 1 in the merged state 910.

CONCLUSION

Having provided the above description, several observations are now noted. The drawings and descriptions thereof are presented in certain orders only for the convenience of description, but not to limit possible implementations. Regarding flow diagrams, the individual processes shown within these diagrams may be performed in orders other than those shown herein without departing from the scope and spirit of this description.

Although the subject matter presented herein has been described in language specific to computer structural features, methodological acts, and computer readable media, it is to be understood that the invention defined in the appended claims is not necessarily limited to the specific features, acts,

| | | | | |
|---|---|---|---|---|
| | | S11 = (Δ1 (Δ3 Δ11, Δ4 Δ12), Δ2 (Δ5, Δ6)) | | |
| | Object | Operation No. | Operation | Comments |
| | X | 1 | Set to 1 | |
| | " | 5 | Set to 0 | Note that operation 5 follows operation 1 and is serially dependent on it (because Δ12 follows Δ1 and was not independent of it). So it is applied after it in the operations table. |
| Grouped Conflicting Operations | Z | 4 | Set to 2 | Note that operation 4 is independent of operation 2 and conflicts with it. Merge rules apply to determine the conflict resolution (e.g., operation with lowest ID takes precedence and wins). Thus, operation 2 appears after operation 4 in the table. |
| | " | 2 | Set to 1 | Note that operation 2 is independent of 4 and conflicts with it. But operation 2 has the lower ID and takes precedence. |
| | " | 6 | Set to 3 | Note that operation 6 follows operation 2 and 4 and is serially dependent on the conflict resolved merge of them (because Δ12 follows the merge of Δ1 and Δ2 in the original version graph and was not independent of either of them). Therefore operation 6 is applied after those two in the resultant operations table. |
| | Y | 3 | Set to 1 | No conflicts on this operation. |
| | Objects other than X, Y, Z | ... | ... | |

The merge process may then calculate the final merged state by traversing through the operations in the list, turning specifically to the three example objects X, Y, and Z:

Object X: its value is set to 1, then set to 0 in serially dependent operations, so value of this object becomes 0 in the merged state 910;

Object Z: its value is set to 2 and 1 in conflicting operations 4 and 2. In this example, the delta operation with the lowest identifier takes precedence, resulting in the value of the object Z being set to 1 (and a potential conflict or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. At least one computer-readable storage medium having computer-executable instructions stored thereon which, when executed by a computer, cause the computer to perform a method comprising:
   receiving a representation of at least one revision to a document that is provided to a plurality of peer systems for collaborative editing;
   storing a first version history of the document that captures at least the revision locally at a first one of the peer systems;
   syncing the first one of the peer systems with at least a second one of the peer systems;
   sending the first version history of the document to the second peer system;
   receiving a second version history of the document from the second peer system, wherein the second version history stores at least one revision occurring locally at the second peer system;
   combining graph representations of the first and second version histories into a combined version history graph; and
   reducing the combined version history graph into a tree representation by
      determining whether a leaf node represents a state that is calculated by the first peer system or the second peer system in connection with a merge operation,
      removing the leaf node in response to determining that the leaf node represents a state that is calculated by the first peer system or the second peer system in connection with a merge operation,
      determining whether the node is associated with at least two immediate parents in the tree representation, and
      in response to determining whether the node is associated with at least two immediate parents in the tree representation, removing all but one of the immediate parents of the node.

2. The storage medium of claim 1, wherein the first version history includes representations of a plurality of versions of the document stored locally on the first peer system, wherein one of the versions include a representation of the revision, further comprising instructions for associating respective unique identifiers with the versions.

3. The storage medium of claim 1, wherein the combined version history graph includes at least one representation of a user revision to the document that transitions the document from a first one of the states to a second one of the states in response to the user revision.

4. The storage medium of claim 1, wherein the combined version history graph includes at least one representation of a system-created revision to the document that transitions the document from a first one of the states to a second one of the states in connection with merging the first and second version histories.

5. The storage medium of claim 1, wherein at least one of the states is created in response to a user revision of the document.

6. The storage medium of claim 1, wherein at least one of the states is created by one of the peer systems in response to merging the first and the second version histories.

7. The storage medium of claim 1, wherein the combined version history graph is implemented as a directed acyclic graph.

8. At least one computer-readable storage medium having computer-executable instructions stored thereon which, when executed by a computer, cause the computer to perform a method comprising:
   syncing a first peer system with at least a second peer system, wherein the first and second peer systems are for receiving respective instances of a document for collaborative editing, and are for maintaining respective first and second version histories associated with the document, wherein the first and second version histories are for capturing and storing revisions occurring locally at the first and second peer systems;
   exchanging the first and second version histories between the first and second peer systems;
   combining graph representations of the first and second version histories into a combined version history graph; and
   reducing the combined version history graph into a tree representation by
      determining whether a leaf node represents a state that is calculated by the first peer system or the second peer system in connection with a merge operation,
      removing the leaf node in response to determining that the leaf node represents a state that is calculated by the first peer system or the second peer system in connection with a merge operation,
      determining whether the node is associated with at least two immediate parents in the tree representation, and
      in response to determining whether the node is associated with at least two immediate parents in the tree representation, removing all but one of the immediate parents of the node.

9. The storage medium of claim 8, further comprising instructions for assigning a unique identifier to the merged state, wherein the unique identifier is identical across the first and second peer systems.

10. A system comprising:
   a first peer system including at least one processor and at least one computer-readable storage medium having computer-executable instructions stored thereon which, when executed by the first peer system, cause the first peer system to provide a first instance of a multi-master merge service that performs a method comprising:
   receiving at least one document that is provided to a plurality of peer systems, including at least the first peer system, for collaborative editing;
   receiving at least a first revision to the document;
   storing at least the first revision in a first version history locally at the first peer system;
   a second peer system including at least one processor and at least one computer-readable storage medium having computer-executable instructions stored thereon which, when executed by the second peer system, cause the second peer system to provide a second instance of a multi-master merge service that performs a method comprising:
   receiving at least the document as provided to the peer systems, including at least the second peer system;
   receiving at least a second revision to the document;
   storing at least the second revision in a second version history locally at the second peer system;
   syncing the second peer system with the first peer system;
   sending the second version history to the first peer system;
   receiving the first version history from the first peer system;
   combining graph representations of the first and second version histories into a combined version history graph;
   reducing the combined version history graph into a tree representation by determining whether a leaf node represents a state that is calculated by the first peer system or the second peer system in connection with a merge operation, removing the leaf node in response to determining that the leaf node represents a state that is calculated by the first peer system or the second peer system in connection with a merge operation, determining whether the node is associated with at least two immediate parents in the tree representation, and in response to determining whether the node is associated with at least two immediate parents in the tree representation, removing all but one of the immediate parents of the node; and merging the first and second version histories.

11. The system of claim 10, wherein the first and second peer systems include respective local storage elements, wherein the local storage elements contain version history information that include representations of the revisions as respectively stored on the first and second peer systems.

12. The system of claim 10, wherein removing all but one of the immediate parents of the node comprises determining retaining the delta operation associated with a lowest unique identifier.

\* \* \* \* \*